(12) United States Patent
Van Sluijs et al.

(10) Patent No.: US 10,144,553 B2
(45) Date of Patent: Dec. 4, 2018

(54) BONDED PACKAGING SYSTEM FOR FOODS

(71) Applicant: BASF SE, Ludwigshafen (DE)

(72) Inventors: Christof Van Sluijs, Leeuwarden (NL); Ivette Garcia Castro, Ludwigshafen (DE); Cedric Du Fresne Von Hohenesche, Frankenthal (DE); Meik Ranft, Bensheim (DE)

(73) Assignee: BASF SE, Ludwigshafen (DE)

( * ) Notice: Subject to any disclaimer, the term of this patent is extended or adjusted under 35 U.S.C. 154(b) by 847 days.

(21) Appl. No.: 14/410,214

(22) PCT Filed: Jun. 25, 2013

(86) PCT No.: PCT/EP2013/063205
§ 371 (c)(1),
(2) Date: Dec. 22, 2014

(87) PCT Pub. No.: WO2014/005879
PCT Pub. Date: Jan. 9, 2014

(65) Prior Publication Data
US 2015/0132447 A1 May 14, 2015

Related U.S. Application Data

(60) Provisional application No. 61/667,969, filed on Jul. 4, 2012.

(30) Foreign Application Priority Data

Jul. 4, 2012 (EP) .................................... 12174948

(51) Int. Cl.
| | | |
|---|---|---|
| *B65D 33/16* | (2006.01) | |
| *B32B 15/04* | (2006.01) | |
| *B32B 15/095* | (2006.01) | |
| *B32B 27/32* | (2006.01) | |

(52) U.S. Cl.
CPC .......... *B65D 33/1691* (2013.01); *B32B 15/04* (2013.01); *B32B 15/095* (2013.01); *B32B 27/32* (2013.01)

(58) Field of Classification Search
CPC . B32B 15/082; B32B 15/095; C08L 23/0807; C08L 75/04; C08L 75/06; C08L 75/08; C09J 123/0869; C09J 123/0876; C09J 175/04; C09J 175/06; C09J 175/08; C09J 175/10; C09J 175/12; C09J 175/14; C09J 175/16
USPC ............................ 428/423.1–425.9; 524/507
See application file for complete search history.

(56) References Cited

U.S. PATENT DOCUMENTS

| | | | |
|---|---|---|---|
| 3,412,054 A | 11/1968 | Milligan et al. | |
| 3,905,929 A | 9/1975 | Noll | |
| 3,920,598 A | 11/1975 | Reiff et al. | |
| 4,192,937 A | 3/1980 | Noll et al. | |
| 4,269,748 A | 5/1981 | Nachtkamp et al. | |
| 4,292,226 A | 9/1981 | Wenzel et al. | |
| 2007/0087189 A1* | 4/2007 | Cooper ................. | B32B 15/082 428/336 |
| 2008/0272916 A1* | 11/2008 | Breysse ................. | B65D 41/62 340/572.8 |
| 2011/0318509 A1* | 12/2011 | Wiegers ............... | B41M 5/5281 428/32.21 |
| 2014/0242323 A1* | 8/2014 | Giorgini ................. | C08G 18/10 428/76 |

FOREIGN PATENT DOCUMENTS

| | | |
|---|---|---|
| CA | 1 129 128 A1 | 8/1982 |
| DE | 1 495 745 A1 | 6/1969 |
| DE | 2 034 479 A1 | 1/1972 |
| EP | 0 813 550 A1 | 12/1997 |
| WO | WO 96/27620 A1 | 9/1996 |
| WO | WO 2007/044999 A1 | 4/2007 |

OTHER PUBLICATIONS

U.S. Appl. No. 14/360,803, filed May 27, 2014, Seyffer, et al.
International Search Report dated Sep. 4, 2013 in PCT/EP2013/063205.

* cited by examiner

*Primary Examiner* — Lee E Sanderson
(74) *Attorney, Agent, or Firm* — Oblon, McClelland, Maier & Neustadt, L.L.P.

(57) ABSTRACT

The present invention relates to a new, adhesively bonded packaging system for foods, more particularly for dairy products.

16 Claims, No Drawings

BONDED PACKAGING SYSTEM FOR FOODS

The present invention relates to a new, adhesively bonded packaging system for foods, more particularly for dairy products.

Foods are frequently packaged by bonding different materials to one another in order to produce a positive combination with one another of their respective properties, such as a barrier effect with respect to oxygen, grease or water vapor, for example. Exactly the same applies to the joining of different constituents of packaging, such as lid, base, and wall, for example, which must be bonded to one another while retaining both imperviosity and the requisite barrier effect, and must also be bondable to one another without the bond adversely affecting the packaged contents.

WO 2007/044999 A1 discloses the use, for the adhesive bonding of polymeric substrates, of a mixture of a dispersion of a copolymer of ethylene and acrylic acid or methacrylic acid with an aliphatic polyurethane dispersion for the heat-sealing of polymeric substrates.

The aliphatic polyurethane dispersion here functions as an adhesion promoter between the coating and the substrate, the substrates that can be used including both polymeric and metallic materials.

The copolymer of ethylene and acrylic or methacrylic acid that is described therein has a number-average molecular weight of 2000 to 50 000, the dispersion in water being obtained by neutralization with alkali or ammonia.

Disadvantages of the subject matter of WO 2007/044999 A1 are the high temperatures of 75 to 140° C. that are required for heat-sealing. Furthermore, there exists a need for coatings for heat-sealing that feature enhanced sealing strength.

The object of the present invention is to provide packaging systems whose heat-sealing coatings are low-melting and exhibit high sealing strength.

This object has been achieved by means of adhesively bonded packaging systems composed at least of the following layers:
(i) substrate 1, selected from the group consisting of aluminum foil, coated aluminum foil, and polyethylene,
(ii) at least one adhesive layer comprising
(A) 5 to 95 wt % of at least one aqueous polyurethane dispersion and
(B) 5 to 95 wt % of at least one acid-functional ethylene copolymer,
(v) substrate 2, selected from the group consisting of aluminum foil, coated aluminum foil, and polyethylene,
the acid-functional ethylene copolymer being composed at least of the monomers ethylene and (meth)acrylic acid and having a weight-average molar weight Mw of at least 45 000 g/mol (measured by GPC as fully methyl-esterified derivative), and
the composition of the adhesive layer (ii) being such that it has a melting point of at least 40° C. and less than 90° C.

The packaging system of the invention is particularly suitable for packaging foods, such as cheese, sausage or margarine, more preferably dairy products, especially cheese or processed cheese.

Qualities exhibited by the adhesive layer in the packaging system of the invention include effective adhesion to the substrates, more particularly to aluminum, a high sealing strength at low melting temperature and low pressure, and a corrosion control effect on aluminum.

The packaging systems of the invention are composed at least of the aforementioned layers (i), (ii), and (v), and may optionally also include further layers between these, more particularly a protective layer (iii) and/or a further substrate layer (iv).

Layer (i) is the substrate 1, selected from the group consisting of aluminum foil, coated aluminum foil, and polyethylene, preferably selected from the group consisting of aluminum foil and coated aluminum foil, and being, more preferably, aluminum foil.

The thickness of this substrate layer is not critical to the invention and is generally from 4 to 20 µm, preferably 6 to 15 µm, and more preferably 8 to 15 µm.

Where the substrate is aluminum, the surface may have been treated with conventional pickling or etching solutions, but preferably with brightening solutions, which may comprise, for example, $HBF_4$, $Na_2CO_3$, $Na_3PO_4$, $H_2SO_4$ and/or $H_3PO_4$, and also sodium or potassium carbonates, hydrogencarbanates, phosphates, hydrogenphosphates, or dihydrogenphosphates.

Coated aluminum may be provided with plastics layers and/or surface-coating layers.

In the case of polyethylene films, the film thickness may be generally from 5 to 25 µm, preferably from 10 to 20 µm, and more preferably 10 to 15 µm.

Applied to the substrate 1 is at least one adhesive layer (ii), it being possible optionally for the substrate 1 to have been provided with a primer as well. As a result of the high level of adhesion of the adhesive layer (ii) of the invention, however, it is possible preferably to do without this primer layer, and so adhesive layer (ii) may be applied directly to the substrate 1.

The adhesive layer (ii) comprises 5 to 95 wt %, preferably 10 to 70 wt %, and more preferably 15 to 40 wt % of at least one aqueous polyurethane dispersion (A) and 5 to 95 wt %, preferably 30 to 90 wt %, and more preferably 60 to 85 wt % of at least one acid-functional ethylene copolymer (B), the composition of the adhesive layer (ii) being such that it has a melting point (measured in accordance with ASTM D3418-82, section 10.1 as $T_m$ (melting peak temperature) at a heating rate of 20° C./min) preferably of at least 40° C. and preferably at least 45° C. and less than 90° C., preferably less than 80° C., more preferably less than 75° C., and very preferably less than 70° C.

In the case of heat-sealing within this temperature range, first of all the thermal load on the food product present in the packaging is extremely low, and secondly it is ensured that the bond between the substrates does not part under temperature increased for a short time.

Preferred aqueous polyurethane dispersions (A) can be prepared by
(I) preparing a polyurethane by reacting
a) polyfunctional isocyanates having 4 to 30 C atoms,
b) diols of which
b1) 10 to 100 mol %, based on the total amount of the diols (b), have a molecular weight of 500 to 5000, and
b2) 0 to 90 mol %, based on the total amount of the diols (b), have a molecular weight of 60 to 500 g/mol,
c) optionally further polyfunctional compounds, different from the diols (b), having reactive groups which are alcoholic hydroxyl groups or primary or secondary amino groups, and
d) monomers different from the monomers (a), (b), and (c) and having at least one isocyanate group or at least one group which is reactive toward isocyanate groups, and further carrying at least one hydrophilic group or potentially hydrophilic group, thereby rendering the polyurethane dispersible in water,
to give a polyurethane, and
(II) subsequently dispersing the polyurethane in water.

Suitable monomers in (a) include the polyisocyanates customarily employed in polyurethane chemistry, examples being aliphatic, aromatic, and cycloaliphatic diisocyanates and polyisocyanates, the aliphatic hydrocarbon radicals containing for example 4 to 12 carbon atoms and the cycloaliphatic or aromatic hydrocarbon radicals containing for example 6 to 15 carbon atoms, or the araliphatic hydrocarbon radicals containing for example 7 to 15 carbon atoms, having an NCO functionality of at least 1.8, preferably 1.8 to 5, and more preferably 2 to 4, and also their isocyanurates, biurets, allophanates, and uretdiones.

The diisocyanates are preferably isocyanates having 4 to 20 C atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyctohexane, trans/trans, the cis/cis and the cis/trans isomer of 4,4'- or 2,4'-di(isocyanatocyclohexyl)methane, 1-isocyanato-3,3,5-trimethyl-5-(isocyanatomehtyl)cyclohexane (isophorone diisocyanate), 2,2-bis(4-isocyanatocyclohexyl)propane, 1,3- or 1,4-bis(isocyanatomethyl)cyclohexane or 2,4- or 2,6-diisocyanato-1-methylcyclohexane, and also aromatic diisocyanates such as 2,4- or 2,6-tolylene diisocyanate and their isomer mixtures, m- or p-xylylene diisocyanate, 2,4'- or 4,4'-diisocyanatodiphenylmethane and their isomer mixtures, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, 1,4-diisocyanatobenzene, or diphenyl ether 4,4'-diisocyanate.

Mixtures of said diisocyanates may also be present.

Preferred aliphatic and cycloaliphatic diisocyanates are isophorone diisocyanate, hexamethylene diisocyanate, meta-tetramethylxylylene diisocyanate (m-TMXDI), and 1,1-methylenebis[4-isocyanato]cyclohexane ($H_{12}MDI$).

Preferred aromatic diisocyanates are 2,4- or 2,6-tolylene diisocyanate and their isomer mixtures, and 2,2'-, 2,4'-, and 4,4'-methylenedi(phenyl isocyanate) and their isomer mixtures.

Suitable polyisocyanates include polyisocyanates containing isocyanurate groups, uretdione diisocyanates, polyisocyanates containing biuret groups, polyisocyanates containing urethane groups or allophanate groups, polyisocyanates comprising oxadiazinetrione groups, uretonimine-modified polyisocyanates of linear or branched $C_4$-$C_{20}$ alkylene diisocyanates, cycloaliphatic diisocyanates having 6 to 20 C atoms in all, or aromatic diisocyanates having 8 to 20 C atoms in all, or mixtures thereof.

The diisocyanates and polyisocyanates which can be used preferably have an isocyanate group (calculated as NCO, molecular weight=42) content of 10 to 60 wt % based on the diisocyanate and polyisocyanate (mixture), preferably 15 to 60 wt % and very preferably 20 to 55 wt %.

Preference as component a) is given to aromatic or aliphatic diisocyanates and polyisocyanates, examples being the abovementioned aromatic or aliphatic diisocyanates, or mixtures thereof.

Preference extends to

1) Polyisocyanates containing isocyanurate groups and formed from aromatic, aliphatic and/or cycloaliphatic diisocyanates. Particular preference is given here to the corresponding aliphatic and/or cycloaliphatic isocyanato-isocyanurates and, in particular, to those based on hexamethylene diisocyanate and isophorone diisocyanate. The isocyanurates present are, in particular, trisisocyanatoalkyl or trisisocyanatocycloalkyl isocyanurates, which represent cyclic trimers of the diisocyanates, or are mixtures with their higher homologs containing more than one isocyanurate ring. The isocyanato-isocyanurates generally have an NCO content of 10 to 30 wt %, in particular 15 to 25 wt %, and an average NCO functionality of 3 to 4.5.

2) Uretdione diisocyanates having aromatically, aliphatically and/or cycloaliphatically attached isocyanate groups, preferably aliphatically and/or cycloaliphatically attached isocyanate groups, and especially those derived from hexamethylene diisocyanate or isophorone diisocyanate. Uretdione diisocyanates are cyclic dimerization products of diisocyanates.

In the formulations the uretdione diisocyanates can be used as sole component or in a mixture with other polyisocyanates, especially those specified under 1).

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18 to 22 wt % and an average NCO functionality of 3 to 4.5.

4) Polyisocyanates containing urethane and/or allophanate groups and having aromatically, aliphatically or cycloaliphatically attached, preferably aliphatically or cycloaliphatically attached, isocyanate groups, as obtainable for example by reacting excess amounts of hexamethylene diisocyanate or of isophorone diisocyanate with polyhydric alcohols such as trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane or mixtures thereof. These polyisocyanates containing urethane and/or allophanate groups generally have an NCO content of 12 to 20 wt % and an average NCO functionality of 2.5 to 3.

5) Polyisocyanates comprising oxadiazinetrione groups, preferably derived from hexamethylene diisocyanate or isophorone diisocyanate. Polyisocyanates of this kind comprising oxadiazinetrione groups can be prepared from diisocyanate and carbon dioxide.

6) Uretonimine-modified polyisocyanates.

The polyisocyanates 1) to 6) can be used in a mixture, optionally also in a mixture with diisocyanates.

Particularly significant mixtures of these isocyanates are the mixtures of the respective structural isomers of diisocyanatotoluene and diisocyanatodiphenylmethane, with particular suitability being possessed by the mixture of 20 mol % 2,4 diisocyanatotoluene and 80 mol % 2,6-diisocyanatotoluene. Also particularly advantageous are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, with the preferred mixing ratio of the aliphatic to aromatic isocyanates being 4:1 to 1:4.

As compounds (a) it is also possible to employ isocyanates which in addition to the free isocyanate groups carry further, blocked isocyanate groups, e.g., uretdione or urethane groups.

Optionally, it is also possible to use those isocyanates which carry only one isocyanate group. In general their fraction is not more than 10 mol %, based on the overall molar amount of the monomers. The monoisocyanates normally carry other functional groups such as olefinic groups or carbonyl groups and serve for introducing, into the polyurethane, functional groups which allow it to be dispersed and/or crosslinked or to undergo further polymer-analogous reaction. Monomers suitable for this purpose include those such as isopropenyl-α,α-dimethylbenzyl isocyanate (TMI).

Diols (b) which are ideally suitable are those diols (b1) which have a relatively high molecular weight of about 500 to 5000, preferably of about 1000 to 3000 g/mol.

The diols (b1) are, in particular, polyester polyols, which are known, for example, from Ullmanns Encyklopädie der technischen Chemie, 4th Edition, Vol. 19, pp. 62 to 65. It is preferred to employ polyester polyols that are obtained by reacting dihydric alcohols with dibasic carboxylic acids. Instead of the free polycarboxylic acids it is also possible to use the corresponding polycarboxylic anhydrides or corresponding polycarboxylic esters of lower alcohols, or mixtures thereof, to prepare the polyester polyols. The polycarboxylic acids can be aliphatic, cycloaliphatic, araliphatic, aromatic or heterocyclic and can be optionally substituted, by halogen atoms, for example, and/or unsaturated. Examples are suberic, azelaic, phthalic, and isophthalic acid, phthalic, tetrahydrophthalic, hexahydrophthalic, tetrachlorophthalic, endomethylenetetrahy-drophthalic, glutaric and maleic anhydride, maleic acid, fumaric acid and dimeric fatty acids. Preference is given to dicarboxylic acids of the general formula HOOC—$(CH_2)_y$—COOH, where y is a number from 1 to 20, preferably an even number from 2 to 20, examples being succinic, adipic, sebacic and dodecanedicarboxylic acids.

Examples of suitable polyhydric alcohols are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes such as 1,4-bis(hydroxymethyl)cyclohexane, 2-methyl-1,3-propanediol and also diethylene glycol, triethylene glycol, tetraethylene glycol, polyethylene glycol, dipropylene glycol, polypropylene glycol, dibutylene glycol and polybutylene glycols. Preference is given to neopentyl glycol and alcohols of the general formula HO—$(CH_2)_x$—OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol.

Also suitable are polycarbonate diols, as can be obtained, for example, by reaction of phosgene with an excess of the low molecular mass alcohols cited as synthesis components for the polyester polyols.

Lactone-based polyester diols are also suitable, these being homopolymers or copolymers of lactones, preferably hydroxy-terminal adducts of lactones with suitable difunctional starter molecules. Suitable lactones are preferably those derived from hydroxycarboxylic acids of the general formula HO—$(CH_2)_z$—COOH, where z is from 1 to 20, preferably an odd number from 3 to 19; examples are ε-caprolactone, β-propiolactone, γ-butyrolactone and/or methyl-ε-caprolactone, and mixtures thereof. Examples of suitable starter components are the low molecular mass dihydric alcohols cited above as synthesis components for the polyester polyols. The corresponding polymers of ε-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids which correspond to the lactones.

Further suitable monomers (b1) are polyether diols. They are obtainable in particular by polymerization of ethylene oxide, propylene oxide, butylene oxide, tetrahydrofuran, styrene oxide or epichlorohydrin with itself, in the presence, for example, of $BF_3$, or by addition reaction of these compounds, alone or in a mixture or in succession, onto starter components containing reactive hydrogens, such as alcohols or amines, examples being water, ethylene glycol, 1,2-propanediol, 1,3-propanediol, 2,2-bis(4-hydroxydiphenyl)propane or aniline. Preferred polyether diols are polyethylene glycol, polypropylene glycol, or polytetrahydrofuran having a molecular weight of 500 to 5000, more preferably 1000 to 4500, more preferably 2000 to 4000 g/mol, and very preferably 3500 to 4500 g/mol.

The polyester diols and polyether diols can also be employed as mixtures in proportions of 0.1:1 to 1:9.

Preferred monomers (b1) are polyester diols.

It is possible to employ as diols (b) not only the diols (b1) but also low molecular mass diols (b2) having a molecular weight of about 50 to 500, preferably from 60 to 200 g/mol.

Compounds employed as monomers (b2) are in particular the synthesis components of the short-chain alkanediols mentioned for the preparation of polyester polyols, with preference being given to the unbranched diols having 2 to 12 C atoms and an even number of C atoms.

The proportion of the diols (b1), based on the total amount of the diols (b), is preferably 10 to 100 mol %, and the proportion of the monomers (b2), based on the total amount of the diols (b), is preferably 0 to 90 mol %. With particular preference the ratio of the diols (b1) to the monomers (b2) is 0.2:1 to 5:1, very preferably 0.5:1 to 2:1.

The monomers (c), which are different from the diols (b), serve generally for crosslinking or chain extension. They are generally nonaromatic alcohols with a functionality of more than two, amines having 2 or more primary and/or secondary amino groups, and compounds which as well as one or more alcoholic hydroxyl groups carry one or more primary and/or secondary amino groups.

Alcohols having a functionality greater than 2, which may serve to bring about a certain degree of crosslinking or branching, are for example trimethylolbutane, trimethylolpropane, trimethylolethane, pentaerythritol, glycerol, sugar alcohols, such as sorbitol, mannitol, diglycerol, threitol, erythritol, adonitol (ribitol), arabitol (lyxitol), xylitol, dulcitol (galactitol), maltitol or isomalt, or sugars.

Also suitable are monoalcohols which in addition to the hydroxyl group carry a further isocyanate-reactive group, such as monoalcohols having one or more primary and/or secondary amino groups, monoethanolamine being one example.

Polyamines having 2 or more primary and/or secondary amino groups are used particularly when the chain extension and/or crosslinking is to take place in the presence of water, since amines generally react more quickly with isocyanates than do alcohols or water. This is frequently necessary when aqueous dispersions of crosslinked polyurethanes or polyurethanes of high molar weight are required. In such cases the approach taken is to prepare prepolymers containing isocyanate groups, to disperse them rapidly in water and then to subject them to chain extension or crosslinking by adding compounds having two or more isocyanate-reactive amino groups.

Amines suitable for this purpose are generally polyfunctional amines of the molar weight range from 32 to 500 g/mol, preferably from 60 to 300 g/mol, which comprise at least two primary, two secondary or one primary and one secondary amino group(s). Examples of such are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be used in blocked form, such as in the form of the corresponding ketimines (see, e.g., CA-1 129 128), ketazines (cf., e.g., U.S. Pat. No. 4,269,748) or amine salts (see U.S. Pat. No. 4,292,226). Oxazolidines as well, as used for example in U.S. Pat. No. 4,192,937, are blocked polyamines which can be used for preparing the polyurethanes for chain extending the prepolymers. When blocked polyamines of this kind are used they are generally mixed with the prepolymers in the absence of water and this mixture is subsequently mixed with the dispersion water or a portion thereof, and so the corresponding polyamines are liberated by hydrolysis.

Preference is given to using mixtures of diamines and triamines, and particular preference to mixtures of isophoronediamine and diethylenetriamine.

The polyurethanes contain preferably no polyamine or 1 to 10, more preferably 4 to 8 mol %, based on the total amount of components (b) and (c), of a polyamine having at least two isocyanate-reactive amino groups, as monomers (c).

A further possibility, for chain termination, is to use minor amounts—that is, preferably, amounts of less than 10 mol %, based on components (b) and (c)—of monoalcohols. Their function is generally similar to that of the monoisocyanates, i.e., they serve primarily to functionalize the polyurethane. Examples are methanol, ethanol, isopropanol, n-propanol, n-butanol, isobutanol, sec-butanol, tert-butanol, ethylene glycol monomethyl ether, ethylene glycol monoethyl ether, 1,3-propanediol monomethyl ether, n-hexanol, n-heptanol, n-octanol, n-decanol, n-dodecanol (lauryl alcohol) and 2-ethylhexanol.

In order to render the polyurethanes dispersible in water they are synthesized not only from components (a), (b) and (c) but also from monomers (d), which are different from components (a), (b) and (c) and carry at least one isocyanate group or at least one group that is reactive toward isocyanate groups, and, in addition, at least one hydrophilic group or a group which can be converted into hydrophilic groups. In the text below, the term "hydrophilic groups or potentially hydrophilic groups" is abbreviated to "(potentially) hydrophilic groups". The (potentially) hydrophilic groups react with isocyanates much more slowly than do the functional groups of the monomers that are used to build up the polymer main chain. The (potentially) hydrophilic groups can be nonionic or, preferably, ionic, hydrophilic groups or can be potentially ionic hydrophilic groups, and with particular preference can be cationic hydrophilic groups or potentially cationic hydrophilic groups, very preferably cationic hydrophilic groups.

The proportion of the components having (potentially) hydrophilic groups as a fraction of the total amount of components (a), (b), (c) and (d) is generally made such that the molar amount of the (potentially) hydrophilic groups, based on the amount by weight of all monomers (a) to (b), is 30 to 1000, preferably 50 to 500, and more preferably 80 to 300 mmol/kg.

Examples of suitable nonionic hydrophilic groups include mixed or pure polyethylene and poly-propylene glycols, more particularly polyethylene glycol ethers, made up of preferably 5 to 100, preferably 10 to 80, repeating ethylene oxide and/or propylene oxide units. The amount of polyethylene oxide units is generally 0 to 10, preferably 0 to 6, wt %, based on the amount by weight of all monomers (a) to (d).

Preferred monomers containing nonionic hydrophilic groups are the polyethylene glycol and diisocyanates which carry a terminally etherified polyethylene glycol radical. Diisocyanates of this kind and also processes for their preparation are specified in patents U.S. Pat. No. 3,905,929 and U.S. Pat. No. 3,920,598.

Ionic hydrophilic groups are, in particular, anionic groups such as the sulfonate, the carboxylate and the phosphate group in the form of their alkali metal or ammonium salts and also cationic groups such as ammonium groups, especially protonated tertiary amino groups or quaternary ammonium groups.

Suitable monomers containing potentially anionic groups are usually aliphatic, cycloaliphatic, araliphatic or aromatic monohydroxycarboxylic and dihydroxycarboxylic acids which carry at least one alcoholic hydroxyl group or one primary or secondary amino group.

Such compounds are represented for example by the general formula

in which
RG is at least one isocyanate-reactive group,
DG is at least one actively dispersing group and
$R^4$ is an aliphatic, cycloaliphatic or aromatic radical comprising 1 to 20 carbon atoms.

Examples of RG are —OH, —SH, —NH$_2$ or —NHR$^5$, where R$^5$ can be methyl, ethyl, iso-propyl, n-propyl, n-butyl, isobutyl, sec-butyl, test-butyl, cyclopentyl or cyclohexyl.

Components of this kind are preferably, for example, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxyacetic acid, hydroxypivalic acid, lactic acid, hydroxysuccinic acid, hydroxydecanoic acid, dimethylolpropionic acid, dimethylolbutyric acid, ethylenediaminetriacetic acid, hydroxydodecanoic acid, hydroxyhexadecanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, and also the alkali metal, alkaline earth metal or ammonium salts thereof and, with particular preference, the stated monohydroxycarboxylic and monohydroxysulfonic acids and also monoaminocarboxylic and monoaminosulfonic acids.

Very particular preference is given to dihydroxyalkylcarboxylic acids, especially those having 3 to 10 carbon atoms, as also described in U.S. Pat. No. 3,412,054. Of particular preference are compounds of the general formula

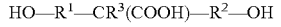

in which $R^1$ and $R^2$ are each a $C_1$- to $C_4$-alkanediyl unit and $R^3$ is a $C_1$- to $C_4$-alkyl unit. Of especial preference are dimethylolbutyric acid and particularly dimethylolpropionic acid (DMPA).

Also suitable are corresponding dihydroxysulfonic acids and dihydroxyphosphonic acids such as 2,3-dihydroxypropanephosphonic acid and also the corresponding acids in which at least one hydroxyl group has been replaced by an amino group, examples being those of the formula

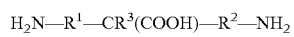

in which $R^1$, $R^2$ and $R^3$ can have the same meanings as specified above.

Otherwise suitable are dihydroxy compounds having a molecular weight above 500 to 10 000 g/mol and at least 2 carboxylate groups, which are known from DE-A 4 140 486. They are obtainable by reacting dihydroxyl compounds with tetracarboxylic dianhydrides such as pyromellitic dianhydride or cyclopentanetetracarboxylic dianhydride in a molar ratio of 2:1 to 1.05:1 in a polyaddition reaction. Particularly suitable dihydroxy compounds are the monomers (b2) listed as chain extenders, and also the diols (b1).

Potentially ionic hydrophilic groups are, in particular, those which can be converted by simple neutralization, hydrolysis or quaternization reactions into the abovementioned ionic hydrophilic groups, examples thus being acid groups, anhydride groups or tertiary amino groups. Ionic monomers (d) or potentially ionic monomers (d) are described in detail in, for example, Ullmanns Encyklopädie der technischen Chemie, 4th edition, Volume 19, pp. 311-313 and, for example, in DE-A 1 495 745.

Monomers having tertiary amino groups, in particular, are of special practical significance as potentially cationic monomers (d), examples being the following: tris(hydroxyalkyl)amines, N,N'-bis(hydroxyalkyl)alkylamines, N-hydroxyalkyldialkylamines, tris(aminoalkyl)amines, N,N'-bis(aminoalkyl)dalkylamines and N-aminoalkyldialkylamines, the alkyl radicals and alkanediyl units of these tertiary amines consisting independently of one another of 2 to 6 carbon atoms. Also suitable are polyethers containing tertiary nitrogen atoms and preferably two terminal hydroxyl groups, such as are obtainable in a conventional manner by, for example, alkoxylating amines having two hydrogen atoms attached to amine nitrogen, examples being methylamine, aniline, or N,N'-dimethylhydrazine. Polyethers of this kind generally have a molar weight of between 500 and 6000 g/mol.

These tertiary amines are converted either with acids, preferably strong mineral acids such as phosphoric acid, sulfuric acid or hydrohalic acids, or strong organic acids, such as formic, acetic or lactic acid, or by reaction with appropriate quaternizing agents such as $C_1$ to $C_6$ alkyl halides, bromides or chlorides for example, or di-$C_1$ to $C_6$ alkyl sulfates or di-$C_1$ to $C_6$ alkyl carbonates, into the ammonium salts.

Suitable monomers (d) having isocyanate-reactive amino groups include aminocarboxylic acids such as lysine, β-alanine, the adducts, specified in DE-A2034479, of aliphatic diprimary diamines with α,β-unsaturated carboxylic acids such as N-(2-aminoethyl)-2-aminoethanecarboxylic acid, and also the corresponding N-aminoalkylaminoalkylcarboxylic acids, the alkanediyl units being composed of 2 to 6 carbon atoms.

Where monomers containing potentially ionic groups are used they can be converted into the ionic form before or during, but preferably after, the isocyanate polyaddition, since the ionic monomers are often only of very sparing solubility in the reaction mixture. With particular preference the carboxylate groups are in the form of their salts with an alkali metal ion or an ammonium ion as counterion.

Within the field of polyurethane chemistry it is general knowledge how the molecular weight of the polyurethanes can be adjusted by choosing the fractions of the co-reactive monomers and by the arithmetic mean of the number of reactive functional groups per molecule.

Normally components (a), (b), (c), and (d) and their respective molar amounts are chosen such that the ratio of the molar amount of isocyanate groups to the sum of the molar amount of the hydroxyl groups and the molar amount of the functional groups which are able to react with isocyanates in an addition reaction is 0.5:1 to 2:1, preferably 0.8:1 to 1.5 and more preferably 0.9:1 to 1.2:1. With very particular preference the ratio of isocyanate groups to isocyanate-reactive groups is as close as possible to 1:1.

In addition to components (a), (b), (c), and (d) use is made of monomers containing only one reactive group generally in amounts of up to 15 mol %, preferably up to 8 mol %, based on the total amount of components (a), (b), (c), and (d).

The polyaddition of components (a) to (d) takes place in general at reaction temperatures of 20 to 180° C., preferably 50 to 150° C., under atmospheric pressure.

The reaction times required may extend from a few minutes to several hours. It is known within the field of polyurethane chemistry how the reaction time is influenced by a multiplicity of parameters such as temperature, monomer concentration, and monomer reactivity.

For accelerating the reaction of the diisocyanates it is possible to use the conventional catalysts. Those suitable in principle are all catalysts commonly used in polyurethane chemistry.

These are, for example, organic amines, particularly tertiary aliphatic, cycloaliphatic or aromatic amines, and/or Lewis-acidic organometallic compounds. Examples of suitable Lewis-acidic organometallic compounds include tin compounds, such as tin(II) salts of organic carboxylic acids, such as tin(II) acetate, tin(II) octoate, tin(II) ethylhexoate and tin(II) laurate, and the dialkyltin(IV) salts of organic carboxylic acids, such as dimethyltin diacetate, dibutyltin diacetate, dibutyltin dibutyrate, dibutyltin bis(2-ethylhexanoate), dibutyltin dilaurate, dibutyltin maleate, dioctyltin di-laurate, and dioctyltin diacetate. Metal complexes such as acetylacetonates of iron, titanium, aluminum, zirconium, manganese, nickel, and cobalt are also possible. Further metal catalysts are described by Blank et al. in Progress in Organic Coatings, 1999, Vol. 35, pages 19-29.

Preferred Lewis-acidic organometallic compounds are dimethyltin diacetate, dibutyltin dibutyrate, dibutyltin bis(2-ethylhexanoate), dibutyltin dilaurate, dioctyltin dilaurate, zirconium acetylacetonate, and zirconium 2,2,6,6-tetramethyl-3,5-heptanedionate.

Bismuth, zinc, and cobalt catalysts as well, and also cesium salts, can be used as catalysts. Suitable bismuth, zinc, and cesium salts include those compounds in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and $(C_{n+1}H_{2n-2}O_4)^{2-}$, n standing for the numbers 1 to 20.

Preference is given to bismuth, zinc, and cesium carboxylates where the anion conforms to the formulae $(C_nH_{2n-1}O_2)^-$ and $(C_{n+1}H_{2n-2}O_4)^{2-}$ with n being 1 to 20. Particularly preferred cesium salts contain monocarboxylate anions of the general formula $(C_nH_{2n-1}O_2)^-$, where n stands for the numbers 1 to 20. Mention may be made in particular here of formate, acetate, propionate, hexanoate, and 2-ethylhexanoate.

The dispersions are usually prepared by one of the following processes:

In accordance with the "acetone process", a polyurethane is prepared from components (a) to (d) in a water-miscible solvent which boils below 100° C. at atmospheric pressure, preferably acetone. Then water is added in an amount sufficient to form a dispersion in which water constitutes the continuous phase.

The "prepolymer mixing process" differs from the acetone process in that first of all, rather than a fully reacted polyurethane, a prepolymer is prepared which carries isocyanate groups. Components (a) to (d) are in this case selected such that the as-defined ratio of isocyanate groups to isocyanate-reactive groups is greater than 1.0 to 3, preferably 1.05 to 1.5. This is followed by crosslinking, by reacting the isocyanate groups with amines which carry more than two isocyanate-reactive amino groups, or by chain extension, by reacting the isocyanate groups with amines which carry 2 isocyanate-reactive amino groups. Chain extension also takes place if no amine is added. In that case, isocyanate groups are hydrolyzed to amine groups, which are consumed by reaction with remaining isocyanate groups in the prepolymers, with chain extension.

Typically, if a solvent has been used when preparing the polyurethane, the major fraction of the solvent is removed from the dispersion, by distillation under reduced pressure, for example. The dispersions preferably have a solvent content of less than 10 wt % and with particular preference are free of solvents.

The dispersions generally have a solids content of 10 to 75, preferably of 20 to 65 wt % and a viscosity of 10 to 500 m Pas (measured at a temperature of 20° C. and a shear rate of 250 s$^{-1}$).

The at least one aqueous polyurethane dispersion (A) preferably comprises polyurethane dispersions which include at least one aromatic building block, in other words at least one aromatic structure—that is, at least one aromatic diisocyanate or polyisocyanate and/or at least one aromatic polyol as synthesis component. This can be achieved through use of at least one aromatic diisocyanate or polyisocyanate (a), preferably 2,4- or 2,6-tolylene diisocyanate and their isomer mixtures and/or 2,2'-, 2,4'-, and 4,4'-methylenedi(phenyl isocyanate) and their isomer mixtures, and/or at least one diol (b1) which comprises at least one aromatic synthesis component.

Preference here is given to polyesters as diols (b1) in which at least one aromatic dicarboxylic acid is used as a synthesis component, preferably phthalic acid (anhydride), isophthalic acid (anhydride), or terephthalic acid.

In one particularly preferred embodiment the polyurethane in the polyurethane dispersion (A) is synthesized from at least one aromatic diisocyanate or polyisocyanate (a) and from at least one polyester which has been synthesized from aliphatic or cycloaliphatic dicarboxylic acids and aliphatic or cycloaliphatic dicarboxylic acids.

The acid-functional ethylene copolymer (B) is synthesized at least from the monomers ethylene and (meth)acrylic acid and has a weight-average molar weight $M_w$ of at least 45 000 g/mol, preferably at least 50 000 g/mol, more preferably at least 55 000 g/mol, very preferably at least 60 000, more particularly at least 65 000, and especially at least 70 000 g/mol (determined by gel permeation chromatography with polystyrene as standard and tetrahydrofuran as eluent). The weight-average molar weight $M_w$ is generally not more than 120 000 g/mol, preferably not more than 110 000, and more preferably not more than 100 000 g/mol.

The weight-average molar weight $M_w$ of the acid-functional ethylene copolymer was determined by GPC on the fully methyl-esterified derivative.

For the full methylation, 10 parts by weight of the acid-functional ethylene copolymer were mixed with 80 parts by weight of methanol and para-toluenesulfonic acid, and the mixture was heated under reflux for 24 hours under atmospheric pressure. The excess methanol is then distilled off, and the derivatized ethylene copolymer is introduced into the GPC measurement.

As a result of this relatively high molar weight it is possible to increase the sealing strength (cohesive strength) of the adhesive layer (ii), so that the bonded substrates do not part so easily from one another.

In one preferred embodiment, the acid-functional ethylene copolymers have a melt flow index (MFI) as tested in accordance with ASTM D1238 at 190° C. under 2.16 kg of 200 to 300 g/10 min, more preferably of 240 to 290 g/10 min. In this test a polymeric melt is forced at defined temperature and under a defined (weight) force through an extrusion plastometer. The melt captured after the respective time period is weighed and converted into the amount, in grams, which would have flowed through within 10 minutes.

In another preferred embodiment, the acid-functional ethylene copolymers have a melting point of more than 35° C., more preferably more than 40, and very preferably of at least 45° C.

The amount of (meth)acrylic acid g), which in this specification stands for methacrylic acid or acrylic acid, in the ethylene copolymer (B) is preferably between 10 and 40 wt % and more preferably between 15 and 30 wt %, and can be determined by ascertaining the acid number, preferably by potentiometry in accordance with DIN EN ISO 3682. In a particularly preferred embodiment, the amount of acrylic acid is from 15 to 30 wt %. In a further particularly preferred embodiment, the amount of methacrylic acid is from 22 to 28 wt %.

This specific amount of (meth)acrylic acid leads on the one hand to an increased adhesion of the adhesive layer (ii) to metallic substrates and on the other hand produces on said substrates a corrosion control effect.

Polyolefin waxes (B) comprise, as formal, copolymerized synthesis components f) at least one olefin without further functional groups,
g) methacrylic acid and/or acrylic acid,
h) optionally at least one monomer which is different from f) and g) and which carries at least one functional group,
in each case in copolymerized form.

The monomers f) comprise at least one olefin without further functional groups, preferably an olefin with precisely one double bond, more preferably an α-olefin, very preferably ethylene.

The olefins f) are preferably pure hydrocarbons without further heteroatoms.

Examples of olefins are ethylene, propylene, 1-butene, 2-butene, isobutene, 1-pentene, 2-pentene, 1-hexene, 1-octene, polyisobutenes having a number-average molecular weight $M_n$ of 100 to 1000 daltons, cyclopentene, cyclohexene, butadiene, isoprene, and styrene.

Examples of α-olefins are those of the formula (I)

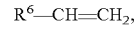

$R^6$—CH=CH$_2$, in which $R^6$ is hydrogen or is $C_1$-$C_{18}$ alkyl which is optionally interrupted by one or more oxygen and/or sulfur atoms and/or by one or more substituted or unsubstituted imino groups, $R^6$ being preferably hydrogen or $C_1$ to $C_4$ alkyl, more preferably hydrogen.

Preferred α-olefins are ethylene, propylene, 1-butene, isobutene, 1-pentene, 1-hexene, and 1-octene, preferably ethylene, propylene, or isobutene, more preferably ethylene or propylene, very preferably ethylene.

The monomer g) is methacrylic acid or acrylic acid.

The monomer h) is optionally at least one monomer which is different from f) and g) and which carries at least one functional group.

Functional groups therein are those groups of atoms which contain atoms other than carbon or hydrogen. Examples of such are hydroxyl, unsubstituted, monosubstituted or disubstituted amino, mercapto, ether, sulfonic acid, phosphoric acid, phosphonic acid, carboxamide, carboxylic ester, sulfonic ester, phosphoric ester, phosphonic ester, or nitrile groups. Preferred groups are hydroxyl, amino, ether, and carboxylic ester groups, more preferably ether groups and carboxylic ester groups.

Examples of monomers h) include $C_1$-$C_{20}$ alkyl (meth)acrylates, $C_1$-$C_{20}$ alkyl alkylene oxide (meth)acrylates, vinyl esters of carboxylic acids comprising up to 20 C atoms, ethylenically unsaturated nitriles, and vinyl ethers of alcohols comprising 1 to 10 C atoms.

Preferred as (meth)acrylic acid alkyl esters are those with a $C_1$-$C_{10}$ alkyl radical, preferably methyl methacrylate, methyl acrylate, n-butyl acrylate, ethyl acrylate, 2-ethylhexyl acrylate, and 2-propylheptyl acrylate.

The $C_1$-$C_{20}$ alkyl alkylene oxide (meth)acrylates are compounds of the formula

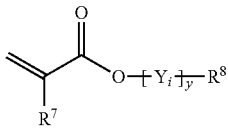

in which
$R^7$ is selected from the group consisting of hydrogen and methyl, preferably hydrogen,
$R^8$ is $C_1$-$C_{20}$ alkyl,
y is a positive integer from 1 to 50, preferably 1 to 40, more preferably 2 to 30, very preferably 3 to 25, and more particularly 4 to 20, and
each $Y_i$ for i=1 to y is selected independently of one another from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O—, and —$CH(CH_3)$—$CH_2$—O—, and more preferably —$CH_2$—$CH_2$—O—, in which Ph is phenyl and Vin is vinyl.

Also suitable in particular are mixtures of the (meth)acrylic acid alkyl esters.

Vinyl esters of carboxylic acids having 1 to 20 C atoms are preferably vinyl laurate, vinyl stearate, vinyl propionate, and vinyl acetate.

Examples of nitriles are acrylonitrile and methacrylonitrile.

Suitable vinyl ethers are, for example, vinyl methyl ether, vinyl isobutyl ether, vinyl hexyl ether, and vinyl octyl ether.

Additionally it is possible to use N-vinylformamide, N-vinylpyrrolidone, and N-vinylcaprolactam.

In the definitions above,
$C_2$-$C_{20}$ Alkylene optionally substituted by aryl, alkyl, aryloxy, alkyloxy, heteroatoms and/or heterocycles is for example 1,1-ethylene, 1,2-ethylene, 1,1-propylene, 1,2-propylene, 1,3-propylene, 1,1-butylene, 1,2-butylene, 1,3-butylene, 1,4-butylene, 1,6-hexylene, 2-methyl-1,3-propylene, 2-ethyl-1,3-propylene, 2,2-dimethyl-1,3-propylene, 2,2-dimethyl-1,4-butylene, $C_1$-$C_{20}$ Alkylene optionally substituted by aryl, alkyl, aryloxy, alkyloxy, heteroatoms and/or heterocycles further comprises methylene, $C_5$-$C_{12}$ Cycloalkylene optionally substituted by aryl, alkyl, aryloxy, alkyloxy, heteroatoms and/or heterocycles is for example cyclopropylene, cyclopentylene, cyclohexylene, cyclooctylene, cyclododecylene, $C_2$-$C_{20}$ Alkylene which is optionally substituted by aryl, alkyl, aryloxy, alkyloxy, heteroatoms and/or heterocycles and which is optionally interrupted by one or more oxygen and/or sulfur atoms and/or by one or more substituted or unsubstituted imino groups and/or by one or more cycloalkyl, —(CO)—, —O(CO)O—, —(NH)(CO)O—, —O(CO)(NH)—, —O(CO)—, or —(CO)O— groups is for example 3-oxa-1,5-pentylene, 3,6-dioxa-1,8-octylene, 3,6,9-trioxa-1,11-undecylene, 4-oxa-1,7-heptylene, 4,8-dioxa-1,11-undecylene, 4,8,12-trioxa-1,15-pentadecylene, 5-oxa-1,9-nonylene, 5,10-dioxa-1,14-tetradecylene, 3-oxa-2,5-dimethyl-1,5-pentylene, 3,6-dioxa-2,5,8-trimethyl-1,8-octylene, 3-oxa-1,4-dimethyl-1,5-pentylene, and 3,6-dioxa-1,4,7-trimethyl-1,8-octylene, $C_6$-$C_{12}$ Arylene optionally substituted by aryl, alkyl, aryloxy, alkyloxy, heteroatoms and/or heterocycles is for example 1,2-, 1,3-, or 1,4-phenylene, 4,4'-biphenylene, tolylene, or xylylene, and $C_1$-$C_{20}$ Alkyl or $C_2$-$C_{20}$ alkyl optionally interrupted by one or more oxygen and/or sulfur atoms and/or by one or more substituted or unsubstituted imino groups is for example methyl, ethyl, propyl, isopropyl, n-butyl, sec-butyl, tert-butyl, pentyl, hexyl, heptyl, octyl, 2-ethyihexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, and preferably methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, eicosyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, pchlorobenzyl, 2,4-dichlorobenzyl, 2-cyanoethyl, 2-cyanopropyl, chloromethyl, 2-chloroethyl, trichloromethyl, trifluoromethyl, 1,1-dimethyl-2-chloroethyl and 2,2,2-trifluoroethyl.

Examples of $R^6$ are hydrogen, methyl, ethyl, n-propyl, isopropyl, n-butyl, sec-butyl, tert-butyl, n-pentyl, n-hexyl, n-octyl, n-decyl, and n-dodecyl.

Preference is given to hydrogen, methyl, ethyl, n-propyl, n-butyl, n-pentyl, and n-hexyl, particular preference to methyl, ethyl, n-butyl, and n-hexyl, and methyl is very preferred.

The composition (in wt %) of the acid-functional polyolefin waxes (B) is generally as follows:

f) 40 to 90, preferably 50 to 85, more preferably 70 to 85 wt %, g) between 10 and 40 wt % and more preferably between 15 and 30 wt %, h) 0 to 25, preferably 0 to 15, more preferably 0 to 10, very preferably 0 to 5, and more particularly 0 wt %, with the proviso that the sum total always makes 100% by weight.

The preparation of the polyolefin wax is accomplished generally as follows:

The polyolefin waxes can be prepared in stirred high-pressure autoclaves or in high-pressure tube reactors. Preparation in stirred high-pressure autoclaves is preferred. The stirred high-pressure autoclaves employed for the preparation process are known per se—a description is found in Ullmann's Encyclopedia of Industrial Chemistry, $5^{th}$ edition, entry headings: Waxes, vol. A 28, p. 146 ff., Verlag Chemie Weinheim, Basel, Cambridge, New York, Tokyo, 1996.

The length:diameter ratio in such autoclaves ranges predominantly from 5:1 to 30:1, preferably 10:1 to 20:1. The high-pressure stirred reactors that can likewise be employed are likewise found in Ullmann's Encyclopedia of Industrial Chemistry, 5th edition, entry words: Waxes, vol. A 28, p. 146 ff., Verlag Chemie Weinheim, Basel, Cambridge, New York, Tokyo, 1996.

Suitable pressure conditions for the polymerization are 500 to 4000 bar, preferably 1500 to 2500 bar. The reaction temperatures are in the range from 170 to 300° C., preferably in the range from 200 to 280° C.

The process can be carried out in the presence of a chain transfer agent. An example of a chain transfer agent used is hydrogen or an aliphatic aldehyde or an aliphatic ketone.

Examples are formaldehyde, acetaldehyde, propionaldehyde, n-butyraldehyde, isobutyraldehyde, n-valeraldehyde, isovaleraldehyde, acetone, ethyl methyl ketone, diethyl ketone, isobutyl methyl ketone, cyclohexanone, cyclopentanone, or cyclododecanone.

The use of propionaldehyde or ethyl methyl ketone as chain transfer agent is especially preferred.

Further very suitable chain transfer agents are alkylaromatic compounds, as for example toluene, ethylbenzene, or one or more isomers of xylene.

Other very suitable chain transfer agents are unbranched aliphatic hydrocarbons such as propane, for example. Particularly good chain transfer agents are branched aliphatic hydrocarbons with tertiary H atoms, as for example isobutane, isopentane, isooctane, or isododecane (2,2,4,6,6-pentamethylheptane). Isodecane is especially suitable.

The amount of chain transfer agent used corresponds to the amounts which are customary for the high-pressure polymerization process.

As initiators for the radical polymerization it is possible to use the customary radical initiators such as organic peroxides, oxygen, or azo compounds, for example. Mixtures of two or more radical initiators are suitable as well.

Radical initiators used are one or more peroxides, selected from the commercially available substances didecanoyl peroxide, 2,5-dimethyl-2,5-di(2-ethylhexanoylperoxy)hexane, tert-amyl peroxy-2-ethylhexanoate, tert-amyl peroxypivalate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbo)cyclohexane in the form of an isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyisopropyl carbonate, 2,2-di-tert-butylperoxybutane or tert-butyl peroxyacetate; tert-butyl peroxybenzoate, di-tert-amyl peroxide, dicumyl peroxide, the isomeric di(tert-butylperoxyisopropyl)benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butyl peroxide, 1,3-diisopropyl monohydroperoxide, cumene hydroperoxide or tert-butyl hydroperoxide; or dimeric or trimeric ketone peroxides.

Dimeric or trimeric ketone peroxides and processes for preparing them are known from EP-A 0 813 550.

Particularly suitable peroxides are di-tert-butyl peroxide, tert-butyl peroxypivalate, tert-amyl peroxypivalate, tert-butyl peroxyisononanoate, or dibenzoyl peroxide, or mixtures thereof. An example of an azo compound is azobisisobutyronitrile ("AIBN"). The radical initiators are metered in amounts customary for polymerizations.

The preparation process is carried out preferably in the presence of solvents, with mineral oils and other solvents which are present in small proportions in the process and have been used, for example, for stabilizing the radical initiator or initiators. Examples of further solvents are aromatic solvents. Particularly preferred aromatic hydrocarbons are toluene, xylene isomers, and ethylbenzene.

Preference is given to aromatic hydrocarbons, (cyclo) aliphatic hydrocarbons, alkanoic acid alkyl esters, alkoxylated alkanoic acid alkyl esters, and mixtures thereof.

Particular preference is given to singly or multiply alkylated benzenes and naphthalenes, alkanoic acid alkyl esters, and alkoxylated alkanoic acid alkyl esters, and also mixtures thereof.

Preferred aromatic hydrocarbon mixtures are those which comprise predominantly aromatic $C_7$ to $C_{14}$ hydrocarbons and may span a boiling range from 110 to 300° C., more preferably toluene, o-, m-, or p-xylene, trimethylbenzene isomers, tetramethylbenzene isomers, ethylbenzene, cumene, tetrahydronaphthalene, and mixtures comprising them.

Examples thereof are the Solvesso® products from ExxonMobil Chemical, particularly Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell. Hydrocarbon mixtures of paraffins, cycloparaffins, and aromatics are also available commercially under the designations Kristalloel (for example, Kristalloel 30, boiling range about 158-198° C., or Kristalloel 60: CAS No. 64742-82-1), white spirit (for example likewise CAS No. 64742-82-1), or solvent naphtha (light: boiling range about 155-180° C., heavy: boiling range about 225-300° C.). The aromatic content of such hydrocarbon mixtures is generally more than 90 wt %, preferably more than 95, more preferably more than 98, and very preferably more than 99 wt %. It may be useful to use hydrocarbon mixtures with a particularly reduced naphthalene content.

The monomers are typically metered in together or separately. The proportion in the case of metered addition customarily corresponds not precisely to the proportion of the monomer building blocks in the polyolefin waxes, since certain monomers are incorporated more readily and more quickly into the polyolefin waxes than are olefins, especially ethylene.

The polyolefin waxes have excellent dispersibility; more particularly, they can be emulsified particularly well in the melted state. Generally speaking, the polyolefin waxes are used in the form of dispersions with a solids content of 10 to 50 wt %, preferably 15 to 40 wt %, and more preferably 20 to 30 wt %.

The acid groups in the polyolefin waxes (B) are preferably at least partly neutralized. For the neutralization the acid groups can be reacted partly or completely with bases, examples being alkali metal or alkaline earth metal oxides, hydroxides, hydrogencarbonates, or carbonates, or amines, preferably ammonia, meaning that the acidic hydrogen atoms thereof are replaced at least in part by alkali metal ions, alkaline earth metal ions, or protonated cations of amines, preferably by sodium, potassium, or ammonium ions, more preferably by ammonium ions ($NH_4^+$).

Purification (2) of the resultant ethylene copolymers from stage (1) is optional and may where practiced take place by washing the copolymers with solvent and then isolating them by filtration or centrifugation.

For the removal of unreacted monomers, a vacuum distillation or stripping procedure may also be useful. For this purpose, for example, in a first step, the major amount of the monomers is removed by distillation, and the remainder of the monomers thereafter by stripping with a gas which is inert under the reaction conditions, preferably an oxygen-containing gas, more preferably air or air/nitrogen mixtures, or else with carbon dioxide or steam.

In general, purification is not required, and is preferably not performed.

Preferred ethylene copolymers (B) of these kinds are available commercially under the trade names Poligen® from BASF SE, Ludwigshafen, Germany, in the form of dispersions, or under the trade name Luwax® from BASF SE, Ludwigshafen, Germany, and also in as-is form as Primacor® from DOW; of these products, the Poligen® CE and Luwax® EAS products are particularly preferred, and Poligen® CE12 and Primacor® 5980 I are especially preferred.

The adhesive layer (ii) may optionally comprise further constituents besides the polyurethane dispersion (A) and the acid-functional ethylene copolymer (B), examples being matting assistants, antiblocking additives, or adhesive resins, but preferably the adhesive layer (ii) consists of the aqueous polyurethane dispersion (A) and of the acid-functional ethylene copolymer (B).

The adhesive layer is applied as an aqueous dispersion in an amount such that following removal of the water there remains generally 1 to 10 g/m² of adhesive layer, preferably 1 to 8, more preferably 2 to 5 g/m².

If the packaging system is to include an optional further layer (iii), then this layer (iii) may comprise styrene-(meth) acrylate dispersions. This layer may serve to protect the applied adhesive layer (ii), though it is also possible to apply such a layer not to the adhesive layer (ii) but instead to the outside of the substrate 1 or 2, where the layer (iii) functions as a primer for a print layer yet to be applied.

The optional further substrate layer (iv) may preferably comprise oriented polypropylene (OPP). A layer of this kind may serve, for example, to separate different packaging constituents, bonded to one another, from one another, and may thus serve for the opening of the packaging. As substrate layer (iv) it is also possible to use a substrate having barrier properties, if desirable to do so.

Layer (v) is substrate 2, selected from the group consisting of aluminum foil, coated aluminum foil, and polyethylene.

These substrates are subject to the comments made above in relation to substrate 1. Substrate 1 and substrate 2 are preferably the same, and more preferably they are both aluminum foil.

The substrates are coated by customary methods known to the skilled person, where aqueous adhesive layer (ii) is applied in the desired thickness to the substrate that is to be coated, and any volatile constituents present are removed from the adhesive layer, optionally with heating. This operation may if desired be repeated one or more times. Application to the substrate may take place in a known way, as for example by spraying, knifing, knifecoating, brushing, rolling, rollercoating, pouring, laminating, or in-mold injection coating.

The substrates are bonded generally by heating at least of the adhesive layer (ii) to a temperature between 45 and 75° C., gently applying pressure to the substrate layers, and then performing cooling.

The invention is described in more detail below by means of examples.

Unless otherwise indicated, ppm and percentage data used in this specification are weight percentages and weight ppm.

EXAMPLES

Comparative Example 1

An acid-functional copolymer was prepared from ethylene and methacrylic acid in a high-pressure autoclave, in the manner described in M. Buback et al., Chem. Ing. Tech. 1994, 66, 510: Ethylene and methacrylic acid were copolymerized continuously. This was done by feeding ethylene continuously (12.0 kg/h) into the high-pressure autoclave under the reaction pressure of 1700 bar. Methacrylic acid (1.3 l/h) was first compressed to an intermediate pressure of 260 bar and then fed continuously, with the aid of a further compressor, under the reaction pressure of 1700 bar, together with ethylene, into the high-pressure autoclave. Separately from this, the initiator solution, consisting of tert-amyl peroxypivalate, was fed continuously into the high-pressure autoclave under the reaction pressure of 1700 bar. Separately from this, optionally, the propionaldehyde was first compressed to an intermediate pressure of 260 bar and then fed continuously into the high-pressure autoclave together with ethylene and methacrylic acid, with the aid of a further compressor, under the reaction pressure of 1700 bar, with the consequence that the melt viscosity measured at 120° C. was approximately 800 mPas (corresponding to Mw=4000 g/mol). The reaction temperature was about 220° C. This gave an ethylene copolymer with 29 wt % methacrylic acid.

The resulting copolymer was neutralized in water with ammonia (1:1 mol/mol, based on the amount of acid) and stirred at 97° C. until a homogeneous emulsion was formed. The polymer content of the emulsion is 20%.

Inventive Example 2

An acid-functional copolymer was prepared from ethylene and methacrylic acid as in comparative example 1, with the difference that the amount of propionaldehyde metered in was such as to give a melt viscosity of 30 000 mPas when measured at 120° C. This corresponds to an Mw of approximately 50 000 g/mol.

The resulting copolymer was neutralized in water with ammonia (1:1 mol/mol, based on the amount of acid) and stirred at 97° C. until a homogeneous emulsion was formed. The polymer content of the emulsion is 20%.

Application Example 3

The acid-functional copolymers from comparative example 1 and inventive example 2, and the commercial acid-functional copolymers specified in the table, were mixed in an 80:20 weight ratio with a commercial polyurethane dispersion NEOREZ® R600, synthesized from (cyclo) aliphatic components, from DSM Neoresins, Waalwijk, The Netherlands.

This mixture was applied to an aluminum foil with a thickness of 12 μm, and dried at 100° C. for 2 minutes to give a dry film thickness of 2.5 g/m$^2$.

The coated aluminum strips were sealed with the coating sides to one another for 30 seconds at 70° C. under an applied pressure of 0.8 N/cm$^2$. The seal strength of the strips, which were 15 mm wide, was determined in a tensile measuring instrument at 150 mm/min. The highest measured strength is taken as the seal strength (strength of the sealed seam) (N/15 mm). The seal strength measurement carries an error margin of around 10%.

The measurements were repeated after storage of the coated and sealed aluminum strips for x days.

|  | Seal strength [N/15 mm] after x days | | | | | |
|---|---|---|---|---|---|---|
| Copolymer | 0 | 1 | 7 | 14 | 21 | 28 |
| Poligen WE3 | 4.2 | 4.0 | 4.1 | 3.9 | 4.1 | 4.0 |
| Poligen CE12 | 4.1 | 4.2 | 4.0 | 3.9 | 3.9 | 4.0 |
| Comparative example 1 | 3.0 | 2.8 | 2.6 | 2.5 | 2.6 | 2.5 |
| Inventive example 2 | 3.4 | 3.3 | 3.1 | 3.0 | 3.2 | 3.0 |

Poligen WE3 and Poligen CE12 are commercial emulsions of acid-functional copolymers with a molar weight Mw each of around 90 000.

It is seen that with the copolymer from inventive example 2, with the higher molecular weight, an increased seal strength is obtained, as compared with the copolymer from comparative example 1, with a low molecular weight.

Application Example 4

The acid-functional copolymer Poligen CE12 was mixed in an 80:20 weight ratio with
a) the commercial polyurethane dispersion NEOREZ® R600 from DSM Neoresins, Waalwijk, The Netherlands,
b) the commercial polyurethane dispersion LUPHEN® D200A from BASF SE, Ludwigshafen, Germany,
c) the commercial polyurethane dispersion ASTACIN® Finish PT from BASF SE, Ludwigshafen, Germany.

LUPHEN® D200A is a polyurethane dispersion which comprises aromatic isocyanates and aliphatic polyesters as synthesis components.

ASTACIN® Finish PT is a polyurethane dispersion based on an aliphatic polyurethane.

The seal strength was measured as described in application example 3.

|  | Seal strength [N/15 mm] after x days | | | | | |
|---|---|---|---|---|---|---|
|  | 0 | 1 | 7 | 14 | 21 | 28 |
| a) Neorez ® R600 | 4.1 | 4.2 | 4.0 | 3.9 | 3.9 | 4.0 |
| b) Luphen ® D200A | 3.7 | 3.7 | 3.9 | 3.7 | 3.8 | 3.9 |
| c) Astacin ® Finish PT | 4.0 | 3.9 | 3.7 | 4.0 | 3.9 | 3.8 |

Both coatings show a high seal strength. It is seen that the coating material which comprises the polyurethane dispersion with aromatic building blocks not only retains its seal strength in the course of storage but in fact increases it, whereas the coating composition comprising aliphatic polyurethane dispersions produces a seal strength which, though high, drops slightly in the course of storage.

Application Example 5 (Comparative)

Application example 3 was repeated using Poligen CE12 as the acid-functional copolymer, and the quantities of polyurethane dispersion Neorez® R600 indicated in the table were admixed—that is, in a), pure acid-functional copolymer was applied. The coating was subsequently sealed and tested as in application example 3.

The measurements were repeated after storage for various days.

|  | Seal strength [N/15 mm] after x days | | | | | |
|---|---|---|---|---|---|---|
| Polyurethane dispersion | 0 | 1 | 7 | 14 | 21 | 28 |
| a) 0% | 4.1 | 3.1 | 1.2 | 1.1 | 1.1 | 1.1 |
| b) 10% | 3.8 | 3.7 | 3.1 | 3.2 | 3.1 | 2.9 |
| c) 20% | 4.1 | 4.2 | 4.0 | 3.9 | 3.9 | 4.0 |

It is seen that the seal strength without admixing of a polyurethane dispersion, after initially good values, collapses to only around a quarter of the initial value after just a few days of storage. As a result of admixing a polyurethane dispersion in the amounts as indicated in b) and c), the seal strength is retained at a high level over the storage time as well.

The invention claimed is:
1. An adhesively bonded packaging system comprising a first substrate, at least one adhesive layer, and a second substrate;
   wherein the first substrate ("substrate 1") is selected from the group consisting of aluminum foil, coated aluminum foil, and polyethylene;
   wherein the at least one adhesive layer comprises (A) 5 wt % to 95 wt % of at least one aqueous polyurethane dispersion, and (B) at least one acid-functional ethylene copolymer that has a molar weight of from 55,000 g/mol to 120,000 g/mol (measured by GPC as fully methyl-esterified derivative);
   wherein (B) is a polyolefin wax that has the following composition:
   f) 40 to 90 wt % of at least one olefin without further functional groups,
   g) between 10 and 40 wt % of methacrylic acid and/or acrylic acid,
   h) 0 to 25 wt % of at least one monomer which is different from f) and g) and which carries at least one functional group,
   with the proviso that the sum total always makes 100% by weight, and wherein the composition of said at least one adhesive layer being such that it has a inciting point of at least 40° C. and less than 90° C.; and wherein the second substrate ("substrate 2") is selected from the group consisting of aluminum foil, coated aluminum foil, and polyethylene.

2. The packaging system according to claim 1, wherein substrates 1 and 2 are an aluminum foil or a coated aluminum foil.

3. The packaging system according to claim 1, wherein the aqueous polyurethane dispersion (A) is prepared by (I) preparing a polyurethane by reacting
a) polyfunctional isocyanates having 4 to 30 carbon atoms,
b) diols of which
b1) 10 to 100 mol %, based on the total amount of the diols (b), have a molecular weight of 500 to 5,000 g/mol, and
b2) 0 to 90 mol %, based on the total amount of the diols (b), have a molecular weight of 60 to 500 g/mol,
c) optionally further polyfunctional compounds, different from the diols (b), having reactive groups which are alcoholic hydroxyl groups or primary or secondary amino groups, and
d) monomers different from the monomers (a), (b), and (c) and having at least one isocyanate group or at least one group Which is reactive toward isocyanate groups, and further carrying at least one hydrophilic group or potentially hydrophilic group, thereby rendering the polyurethane dispersible in water,
to give a polyurethane, and
(II) subsequently dispersing the polyurethane in water.

4. The packaging system according to claim 3, wherein isocyanate a) is aromatic.

5. The packaging system according to claim 3, wherein isocyanate a) is aliphatic.

6. The packaging system according to claim 3, wherein the diol b1) is a polyesterdiol.

7. The packaging system according to claim 3, wherein the diol b1) is selected from the group consisting of polyethylene glycol, polypropylene glycol, and polytetrahydrofuran having a molecular weight of 500 to 5,000 g/mol.

8. The packaging system according to claim 1, wherein at least some of the acid groups in the polyolefin wax (B) are neutralized with ammonia.

9. A method for constructing packaging comprising bonding or sealing together the first substrate, the at least one adhesive layer, and the second substrate according to claim 1.

10. The method of claim 9, comprising applying the at least one adhesive layer to at least one substrate, and heating the at least one adhesive layer to a temperature ranging from 45° C. to 75° C., applying pressure to the substrate layers, and cooling.

11. A method for packaging food comprising sealing or incorporating a food inside the adhesively-bonded packaging system of claim 1.

12. The method of claim 11, wherein the food is a dairy product.

13. The method of claim 11, wherein the food is selected from the group consisting of cheese, sausage and margarine.

14. The food product of claim 11 that is a dairy product.

15. The food product of claim 11 that is selected from the group consisting of cheese, sausage and margarine.

16. A food product comprising the adhesively-bonded packaging system of claim 1.

* * * * *

UNITED STATES PATENT AND TRADEMARK OFFICE
CERTIFICATE OF CORRECTION

PATENT NO. : 10,144,553 B2
APPLICATION NO. : 14/410214
DATED : December 4, 2018
INVENTOR(S) : Christof Van Sluijs et al.

Page 1 of 1

It is certified that error appears in the above-identified patent and that said Letters Patent is hereby corrected as shown below:

In the Specification

In Column 3, Line 22, delete "1,2-diisocyanatocyctohexane," and insert
-- 1,2-diisocyanatocyclohexane, --, therefor.

In Column 3, Lines 24-25, delete "(isocyanatomehtyl)" and insert -- (isocyanatomethyl) --, therefor.

In Column 8, Line 37 (approx.), delete "test-butyl," and insert -- tert-butyl, --, therefor.

In Column 9, Lines 30-31, delete "N,N'-bis(aminoalkyl)dalkylamines" and insert -- N,N'-bis(aminoalkyl)alkylamines --, therefor.

In Column 14, Line 37 (approx.), delete "2-ethyihexyl," and insert -- 2-ethylhexyl, --, therefor.

In Column 14, Line 64, delete "pchlorobenzyl," and insert -- p-chlorobenzyl, --, therefor.

In Column 18, Line 15 (approx.), delete "knifecoating," and insert -- knife coating, --, therefor.

In Column 18, Line 16 (approx.), delete "rollercoating," and insert -- roller coating, --, therefor.

In the Claims

In Column 21, Line 2, Claim 1, delete "inciting" and insert -- melting --, therefor.

In Column 21, Line 27 (approx.), Claim 3, delete "Which" and insert -- which --, therefor.

Signed and Sealed this
Twenty-eighth Day of April, 2020

Andrei Iancu
*Director of the United States Patent and Trademark Office*